Dec. 16, 1958     W. R. SCHOBER     2,864,993

WELDING TRANSFORMER WITH COMPOUND SECONDARY WINDING

Filed Nov. 10, 1955     3 Sheets-Sheet 1

*INVENTOR.*
WILLIAM R. SCHOBER

BY Toulmin & Toulmin

Dec. 16, 1958 W. R. SCHOBER 2,864,993
WELDING TRANSFORMER WITH COMPOUND SECONDARY WINDING
Filed Nov. 10, 1955 3 Sheets-Sheet 2

INVENTOR.
WILLIAM R. SCHOBER
BY Toulmin & Toulmin

Dec. 16, 1958    W. R. SCHOBER    2,864,993
WELDING TRANSFORMER WITH COMPOUND SECONDARY WINDING
Filed Nov. 10, 1955    3 Sheets-Sheet 3

INVENTOR.
WILLIAM R. SCHOBER
BY
Toulmin & Toulmin

United States Patent Office 2,864,993
Patented Dec. 16, 1958

2,864,993

WELDING TRANSFORMER WITH COMPOUND SECONDARY WINDING

William R. Schober, Troy, Ohio, assignor to The Hobart Brothers Company, Troy, Ohio, a corporation of Ohio Application November 10, 1955, Serial No. 546,176

15 Claims. (Cl. 323—56)

This invention relates to welding transformers and, in particular, to welding transformers having one or more variable reluctance leakage paths whereby the output characteristics can readily be regulated.

Such a transformer is illustrated and described in detail in co-pending application, Serial No. 400,038, now Patent No. 2,802,981, issued August 13, 1957, filed in the name of Hobart, Blankenbuehler and Schober and assigned to the same assignee as the instant application.

The present invention is concerned with a transformer of the nature disclosed in the above-identified patent, but proposes the addition of a still further secondary winding or windings so related to the leakage paths of the transformer as to permit substantially extending the range of operation of the transformer at both limits thereof.

A particular object of the present invention is the provision of a welding transformer which is extremely efficient in operation.

Another object of the present invention is the provision of a welding transformer and a method of operation thereof such that a wide range of welding currents can be drawn from a transformer of a given size.

Another particular object of the present invention is the provision of a welding transformer and a method of operation in which the transformer has substantially greater range than similar transformers of corresponding size, but in which the extension of the range of the transformer does not influence the no-load voltage of the transformer.

A further object of the present invention is the provision of a welding transformer having a variable reluctance leakage path and a compound secondary winding in which a portion of the secondary winding is associated with the leakage path in such a manner as to increase the range of the transformer and without affecting the no-load voltage characteristics thereof.

A still further object of the present invention is the provision of a method and apparatus for providing a broad range of values for a saturable core reactor device in a simple effective manner.

These and other objects and advantages of this invention will become more apparent upon reference to the following specification taken in connection with the accompanying drawings, in which.

Figure 1:
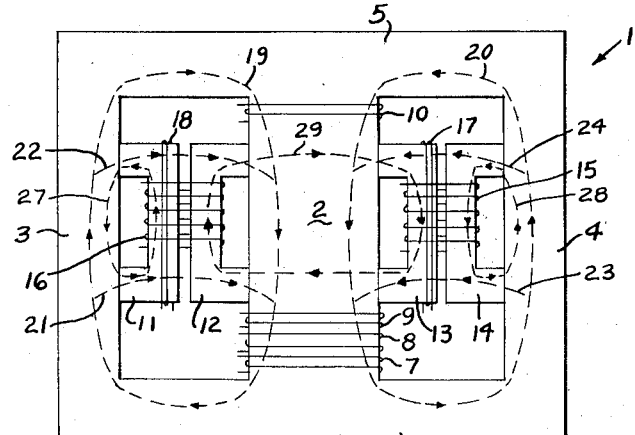
Figure 1 is a more or less diagrammatic representation of a shell-type transformer constructed according to the present invention.

Referring to the drawings somewhat more in detail, the shell-type transformer shown in Figure 1 comprises a core 1 having a center leg 2, side legs 3 and 4, and end members 5 and 6.

On one end of center leg 2 is primary winding 7, auxiliary secondary winding 8, and load secondary winding 9. Spaced from loading winding 9 is a second secondary load winding 10 for being connected in series with load secondary winding 9.

Between leg 2 and side legs 3 and 4 are located the C-shaped members 11, 12, 13 and 14 and spaced in back-to-back relation as shown whereby leakage paths are provided between leg 2 and legs 3 and 4.

Control windings 15 and 16 surround the back parts of the C-shaped members and are energizable for varying the degree of saturation of the leakage paths thereby to vary the reluctance thereof. These windings do not link any of the leakage flux.

According to the present invention at least one part of the leakage paths has associated therewith a compound secondary winding, as at 17, adapted for being connected in series with the load secondary windings 9 and 10. In Figure 1 there is also a compound secondary winding at 18. These windings link the leakage flux but do not link the control flux from windings 15, 16.

Figure 7:
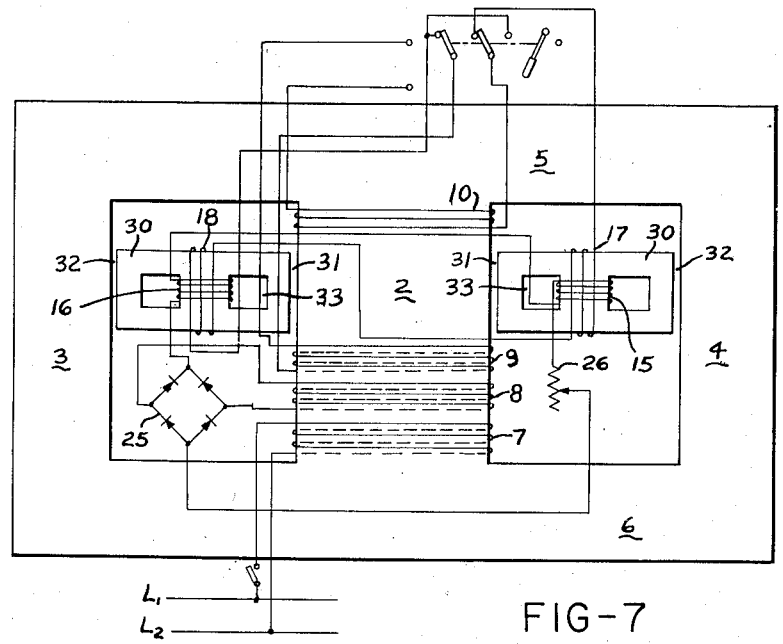
Figure 7 is a diagrammatic view illustrating schematically the electric circuit and core arrangement of a shell-type transformer according to the present invention.

Reference to the circuit diagram in Figure 7 will show that auxiliary secondary winding 8 is connected via a four-way rectifier 25 and an adjustable current limiting circuit element, such as rheostat 26, with the control windings 15 and 16 which may be in series or in parallel.

To provide for reversing the polarity of the compound windings 17, 18 in the secondary circuit, these windings are connected between the terminals of a reversing switch 67 which has two operative positions for the two respectively opposite directions of the compound windings in the secondary circuit.

The operation of the Figure 1 embodiment is as follows: Under no-load conditions the magnetizing flux established by the magnetomotive force developed by primary 7 is represented by the dashed lines 19, 20.

As a load is placed across the output terminals of the transformer and the secondary windings commence to carry current the magnetomotive force developed by the secondary windings causes a portion of the flux from primary winding 7 to be diverted through the leakage paths, as indicated by the dashed lines 21, 22, 23 and 24.

The amount of the flux thus diverted, and thus the degree at which the coupling of secondary winding 10 with primary winding 7, is loose and the degree at which the secondary voltage characteristic curve of the transformer droops is determined by the reluctance of the leakage paths, and this is controlled by the degree of energization of control windings 15, 16 which, when energized, causes flux to be established in the paths represented by the dashed lines 27, 28 and 29, and which flux, it will be apparent, will vary the degree of saturation of the leakage paths and will, therefore, vary the reluctance thereof; and, in turn, regulate the amount of leakage flux passing along the leakage paths.

According to this invention the compound secondary windings 17, 18 carry the secondary load current, and when they are connected such that the secondary current passing through them establishes a magnetomotive force tending to increase the leakage flux, the voltage induced in the compound windings opposes the flow of secondary current, thus causing the voltage characteristic curve to droop more sharply thereby limiting the flow of secondary current.

If the compound windings are reversed so that the secondary current which passes therethrough develops a magnetomotive force which tends to reduce the amount of leakage flux in the leakage paths the voltage induced in the compound windings assists in the flow of secondary current thereby increasing the range of the transformer.

By properly choosing the length of the air gap in the leakage paths the voltage induced in the compound windings at no-load can be made negligible, thus maintaining the proper voltage at the transformer terminals for striking arcs.

An advantage of the present invention, apart from increasing the range of the transformer, comes about because, ordinarily, in order to obtain high secondary current the number of closely-coupled secondary turns (winding 9) exceeds the number of loosely-coupled secondary turns (winding 10), and when the secondary circuit is loaded the reactance voltage drop across the loosely-coupled secondary turns rises until it exceeds the no-load voltage induced therein. Under these circumstances the component of leakage flux passing through the upper member 5 of the transformer core, and linking the loosely-coupled secondary turns, is so great that saturation of the iron in these areas may begin to take place which is detrimental to smooth deposition of weld metal.

Figure 2:
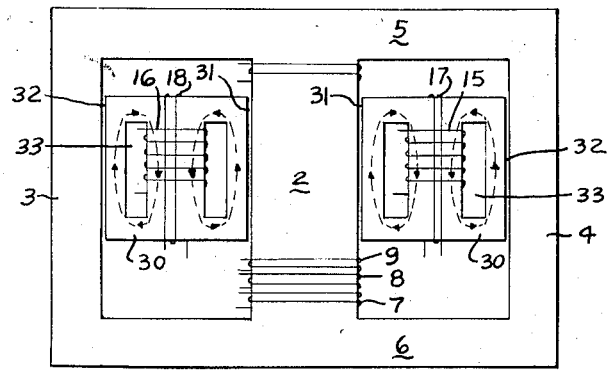
Figure 2 shows a somewhat modified form which the transformer, according to Figure 1, can take.

In Figure 2 substantially the same arrangement is illustrated as in Figure 1 and, where applicable, the same reference numerals have been employed. In Figure 2 the principal difference resides in the nature of the members which establish the leakage paths. In this view these members on each side of center leg 2 are constituted of single elements, represented by reference numeral 30, which are spaced from the center and outer legs as by the air gaps 31 and 32 and have apertures 33 therein through which the control windings 15, 16 are wound.

Figure 3:
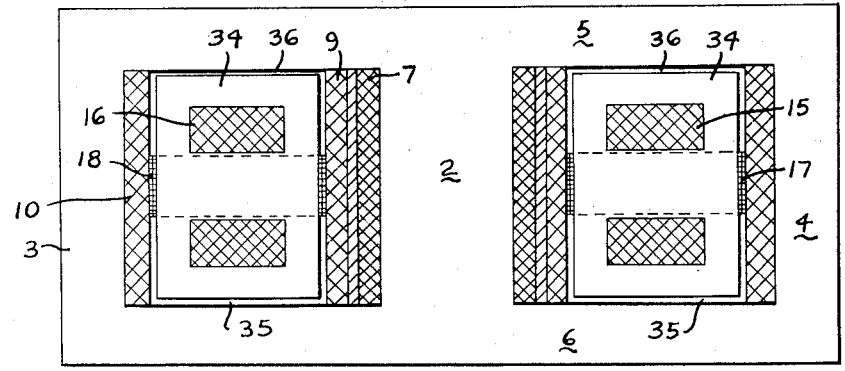
Figure 3 shows another modified form of the transformer drawn to indicate about the manner in which the various windings of the transformer would be disposed in the spaces about the core.

The Figure 3 arrangement is similar to the Figures 1 and 2 structures and the same numbers that have been employed in connection with the Figure 1 modification are applicable. In Figure 3, however, the loose-coupled secondary winding 10 is concentric with primary winding 7 and close-coupled secondary load winding 9, and the members 34 which establish leakage paths are arranged between the top and bottom members 5, 6 of the core with the intervening air gaps 35, 36. The members 34 are provided with apertures into which the control windings 15, 16 are wound. The compound secondary windings 17, 18 are then disposed about the members 34 as indicated.

Figure 4:
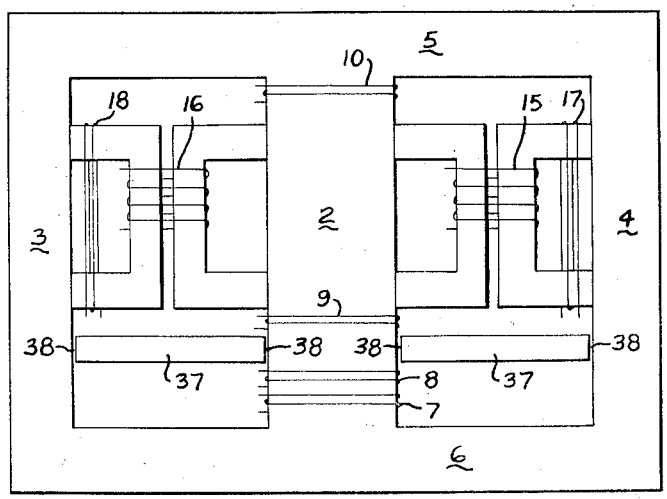
Figure 4 is a view showing still another modified form in which an auxiliary fixed reluctance leakage path is associated with the transformer core.

In Figure 4 an arrangement substantially identical with the Figure 1 structure is illustrated, with the same reference numerals applied thereto where applicable. Figure 4 differs from the Figure 1 arrangement in that the leakage path members 37 are disposed between center leg 2 and side legs 3 and 4 with air gaps 38 therebetween and located between primary winding 7 and the closely-coupled secondary winding 9.

Figure 5:
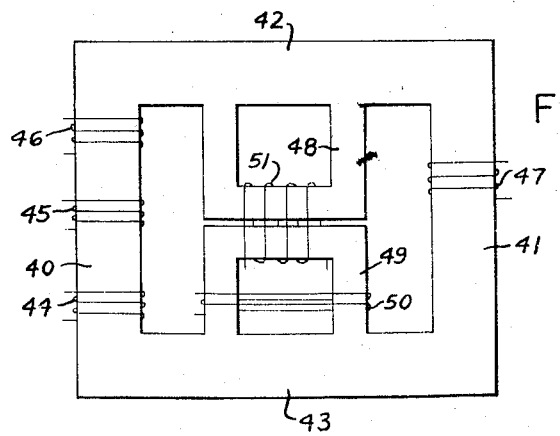
Figure 5 is a view showing a core-type transformer constructed according to the present invention.

Figure 5 illustrates the present invention as applied to a core-type transformer. In Figure 5 the core has side legs 40 and 41 with interconnecting end members 42 and 43. Primary winding 44, auxiliary secondary winding 45, and closely-coupled load secondary winding 46 are mounted on leg 40 and loosely-coupled load secondary winding 47 adapted for being connected in series with secondary winding 46 mounted on leg 41.

Between end members 42 and 43 are C-shaped magnetic members 48 and 49 which establish spaced leakage paths about which compound secondary winding 50, adapted for being connected in series in the secondary load circuit, is placed. A direct current control winding 51 is wound about the backs of the C-shaped members 48 and 49 and provide the means for varying the degree of saturation of the leakage paths.

Figure 8:
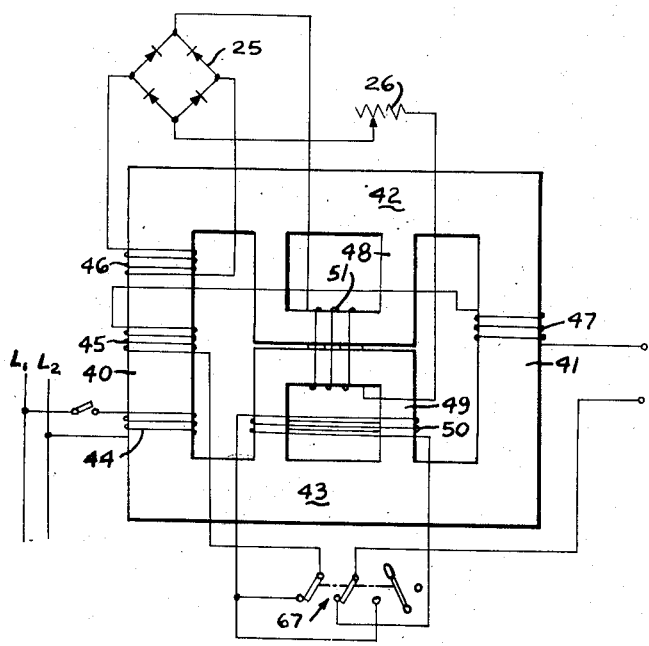
Figure 8 is a view similar to Figure 7 except showing a core-type transformer.

Figure 8 is a circuit diagram similar to that of the Figure 7 arrangement but showing the circuit for the Figure 5 arrangement.

Figure 6:
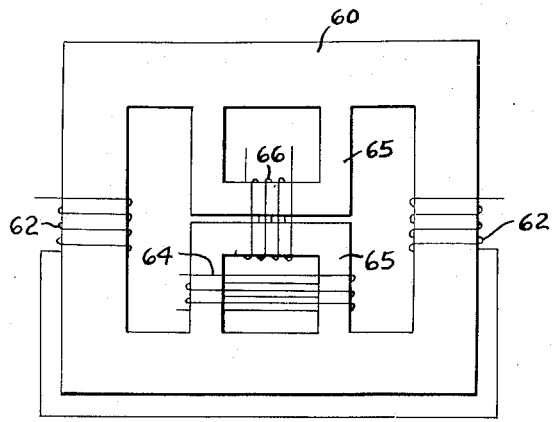
Figure 6 is a diagrammatic view showing an arrangement similar to Figure 5 but wherein the device is employed as a variable reactor rather than as a transformer.

The structure of Figure 6 is that of a reactor having a core 60 similar to the core of the Figure 5 arrangement, but having load windings 62 located on opposite legs of the core connected in series and arranged in reverse polarity. Compound winding 64 about the leakage path members 65 is arranged for connection in the load circuit so as to either decrease or increase the degree of saturation of the leakage paths established by the members 65, thereby to vary the inductive reactance of the reactor. The control winding 66, adapted for being energized by direct current, is arranged about the backs of members 65 for variable saturation of the leakage paths.

It will be understood that this invention is susceptible to modification in order to adapt it to different usages and conditions, and, accordingly, it is desired to comprehend such modifications within this invention as may fall within the scope of the appended claims.

I claim:

1. In an alternating current induction apparatus; a magnetic core having spaced serially connected windings thereon, a magnetic leakage path associated with the core for each said winding and each said path including an air gap, electromagnetic means extending between said paths on opposite sides of the air gaps therein and forming with said paths closed magnetic circuits, each said circuit including at least a portion of each leakage path and at least a portion of said electromagnetic means, means for variably energizing said electromagnetic means for varying the saturation of said leakage paths and thereby varying the self-inductance of said windings, and a winding in series with said serially connected windings wound around both of said leakage paths.

2. In a welding transformer; a magnetic core having a center and two outer legs with end members connecting the ends of said legs, a group of windings around said center leg comprising a primary and a plurality of secondary windings, an additional secondary winding around said center leg, magnetic leakage path means extending between the center leg and the outer legs and magnetically contacting said center leg between said group of windings and said additional secondary winding, air gaps in said leakage path means, a control coil magnetically associated with each said leakage path means energizable to magnetize the leakage paths but so arranged that only an insignificant percentage of the total leakage flux through said leakage path means links the turns of said control coil, and a winding about the leakage path means linking the leakage flux therein but not linking the flux from the control coil adapted for being connected in circuit with said secondary windings.

3. An alternating current transformer; a magnetic core having a center and two outer legs with end members connecting the ends of said legs, a group of windings around said center leg comprising a primary and a plurality of secondary windings, an additional secondary winding around said center leg, means providing a plurality of magnetic leakage paths between the center leg and the outer legs of the core, said means located between the said group of windings and said additional secondary winding and comprising a plurality of magnetic leakage core members, an air gap in each leakage path, control coil means located between pairs of said leakage paths energizable for magnetizing said leakage paths but so located that only an insignificant percentage of the total leakage flux through said leakage paths links the turns of said control coil, and a winding about the leakage paths linking the leakage flux therein but not the flux from the control coil adapted for being connected in circuit with said secondary windings.

4. In a welding transformer; a magnetic core having a center and two outer legs with end members connecting the ends of said legs, a group of windings around said center leg comprising a primary and a plurality of secondary windings, an additional secondary winding around said center leg, means providing a pair of magnetic leakage paths between the center leg and each outer leg, each of said means comprising a pair of magnetic C-shaped leakage core members, said members placed back to back with the ends in contacting relationship with the said center leg between said group of windings and said additional secondary winding and with an air gap between the backs of said leakage core members, a control coil around the backs of each pair of leakage core members, and a winding surrounding at least one pair of the leakage paths linking the leakage flux therein but not linking the flux from the pertaining control coil adapted for being connected in circuit with said secondary windings.

5. In a welding transformer; a magnetic core having a plurality of legs with end members connecting the ends thereof, a group of windings comprising a primary and a plurality of secondary windings around one of said legs, an additional winding spaced from said group of windings around one of said legs, spaced magnetic members mounted between adjacent said legs and between said group of windings and said additional secondary winding forming spaced magnetic leakage paths, control coil means magnetically associated with said leakage paths energizable for varying the saturation thereof, said control coil means being located between said leakage paths whereby only an insignificant percentage of the total leakage flux through said leakage paths links the turns of said control coil means, and a winding encircling a pair of the leakage paths linking the leakage flux therein but not linking the flux from the control coil means pertaining thereto adapted for being connected in circuit with said secondary windings.

6. In a welding transformer; a magnetic core having a center and two outer legs with end members connecting the ends of said legs, a group of windings around said center leg comprising a primary and a plurality of secondary windings, an additional secondary winding around said center leg, pairs of magnetic leakage path means mounted between adjacent legs and between said group of windings and said additional secondary winding, an air gap in each said leakage path means, a control coil positioned in magnetizing relation to each said pair of leakage path means but with the axis of said control coil being perpendicular to the direction of alternating current leakage flux flow, and a winding around each said pair of leakage path means linking the leakage flux therein but not linking the flux from the control coil adapted for being connected in circuit with said secondary windings.

7. In a welding transformer; a magnetic core having a center and two outer legs with end members connecting the ends of said legs, a group of windings around said center leg comprising a primary and a plurality of secondary windings, an additional secondary winding around said center leg, means providing a pair of spaced leakage paths between adjacent legs, each of said means comprising a pair of magnetic C-shaped leakage core members, said members placed back to back with the ends in contacting relationship with the respective leg between said group of windings and said additional secondary winding, and with the backs of each pair of leakage core members spaced to provide an air gap in each leakage path, a control coil positioned around the backs of each pair of leakage core members, each said control coil having its axis perpendicular to the direction of alternating current leakage flux flow, and a winding around the leakage paths linking the leakage flux therein but not linking the flux from the control coil adapted for being connected in circuit with said secondary windings.

8. In a saturable core reactance device; a magnetic core having a load winding thereon, a pair of parallel magnetic members associated with said core in shunting relation with said winding, air gaps in the leakage paths formed by said members, a control coil between said members energizable for varying the saturation of said leakage paths, a compound winding wound around both of said members so as to link the load flux in said shunt while not linking the flux of the control coil, and means for connecting said compound winding in series with said load winding.

9. A saturable core reactance device according to claim 8, including means for reversibly connecting said compound winding in series with said load winding.

10. In a stationary induction apparatus; a pair of spaced windings, magnetic means forming a closed core through said windings, a pair of spaced magnetic members in shunting relation with at least one of said windings to establish a pair of leakage paths and there being an air gap in each said path, electromagnetic means including a control winding extending between said members on an axis at right angles to the path of leakage flux in said members so as to have substantially no leakage with linkage flux in said paths energizable for varying the saturation of both of the leakage paths, and a compound winding surrounding both of said magnetic members so as to be in inductive relation with leakage flux in said path and in non-inductive relation with the flux from said control winding adapted for being connected in series with at least one of said spaced windings.

11. In a stationary induction apparatus; a pair of spaced windings, magnetic means forming a closed core through said windings, a pair of spaced magnetic members in shunting relation with at least one of said windings to establish a pair of leakage paths and there being an air gap in each said path, electromagnetic means including a control winding extending between said members on an axis at right angles to the path of leakage flux in said members so as to have substantially no leakage with linkage flux in said paths energizable for varying the saturation of both of the leakage paths, and a compound winding surrounding both of said magnetic members so as to be in inductive relation with leakage flux in said path and in non-inductive relation with the flux from said control winding adapted for being connected in series with at least one of said spaced windings, there being switch means selectively operable for reversibly connecting the compound winding in series with said spaced windings.

12. In an alternating current induction apparatus; a magnetic core having leg means connected by end members, said leg means having a pair of serially connected windings mounted thereon in spaced relation, individual magnetic leakage paths formed between said leg means for each of said windings and said paths also being in spaced relation and each including an air gap, electromagnetic means extending between said paths on an axis at right angles to the direction of leakage flux in said paths, means for variably energizing said electomagnetic means to vary the saturation of said paths and thereby vary the self-inductance of said windings, and a winding in series with said serially connected windings wound around both of said leakage paths.

13. In a welding transformer, a magnetic core having a plurality of legs with end members connecting the ends thereof, a group of windings comprising a primary and plurality of secondary windings around one of said legs, an additional secondary winding spaced from said group of windings around one of said legs, means forming a pair of spaced magnetic leakage paths mounted between adjacent legs and located between said group of windings and said additional secondary winding, an air gap in each said leakage path, a single direct current control coil means associated with each said pair of leakage paths energizable for varying the saturation of said leakage paths, a rectifier having an input side electrically connected to one of the said secondary windings of said group of windings, said control coil means being electrically connected to the output side of said rectifier, means to vary the magnitude of the control current, said control coil means being located between said spaced leakage paths thereby to be disposed out of the path of said leakage flux, there being magnetic members extending between said leakage paths and through said control coil, and a winding wound about both of said pair of leakage paths linking the leakage flux therein but not linking the flux from the control coil means adapted for being connected in circuit with said secondary windings.

14. In a welding transformer; a primary winding, a first secondary winding adjacent the primary winding, a second secondary winding spaced from the primary winding, a magnetic core through the windings, parallel leakage path means including air gap means and a pair of magnetic members arranged in bypassing relation to the second secondary winding, control coil means located between said magnetic members energizable for variably saturating said leakage path means, and a third winding wound around both of said leakage path means but not linking the saturating flux therein from the control coil means adapted for connection in series with said first and second secondary windings.

15. In a welding transformer; a primary winding means and a secondary winding means, said second winding means comprising a portion loosely coupled with said primary winding means, a pair of spaced magnetic members forming parallel leakage path means arranged in bypassing relationship with said portion of said secondary winding means thus creating the said loose coupling condition and said leakage path means including an air gap, means located between the leakage path means so as to be insensitive to the leakage flux therein operable for variably saturating said leakage path means, and a compound winding wound around both of said leakage path means arranged to link with the leakage flux in said leakage path means but not linking the saturating flux and adapted for being connected in circuit with said secondary winding means.

References Cited in the file of this patent

UNITED STATES PATENTS

| | | |
|---|---|---|
| 1,815,516 | Lee | July 21, 1931 |
| 2,380,521 | Haug | July 31, 1945 |
| 2,432,343 | Short | Dec. 9, 1947 |
| 2,464,287 | Beamer | Mar. 15, 1949 |
| 2,500,189 | Landis | Mar. 14, 1950 |